Feb. 20, 1951  R. L. HENDERSON ET AL  2,542,330
CONVEYER SYSTEM
Filed May 7, 1947  5 Sheets-Sheet 2
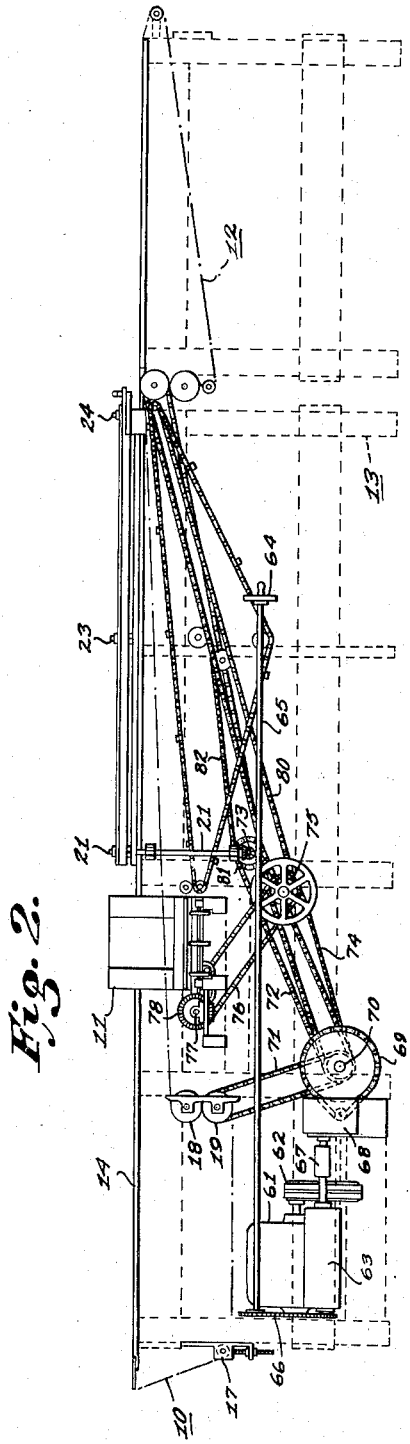
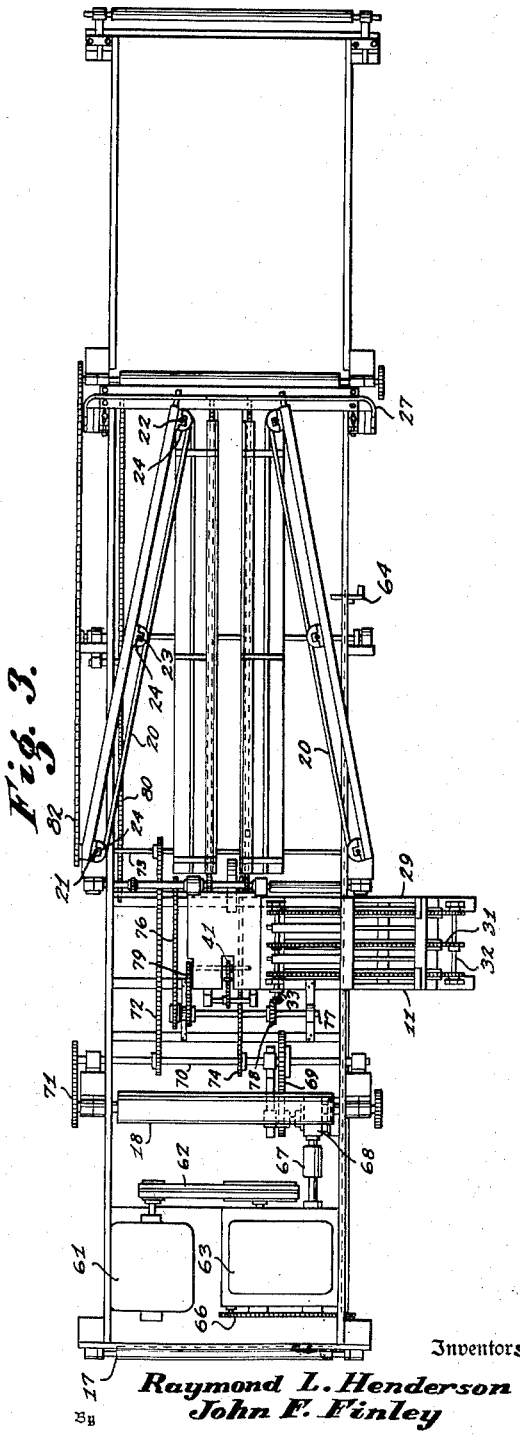
Inventors
Raymond L. Henderson
John F. Finley
Parrott and Richards
Attorneys Feb. 20, 1951 R. L. HENDERSON ET AL 2,542,330
CONVEYER SYSTEM
Filed May 7, 1947 5 Sheets-Sheet 3

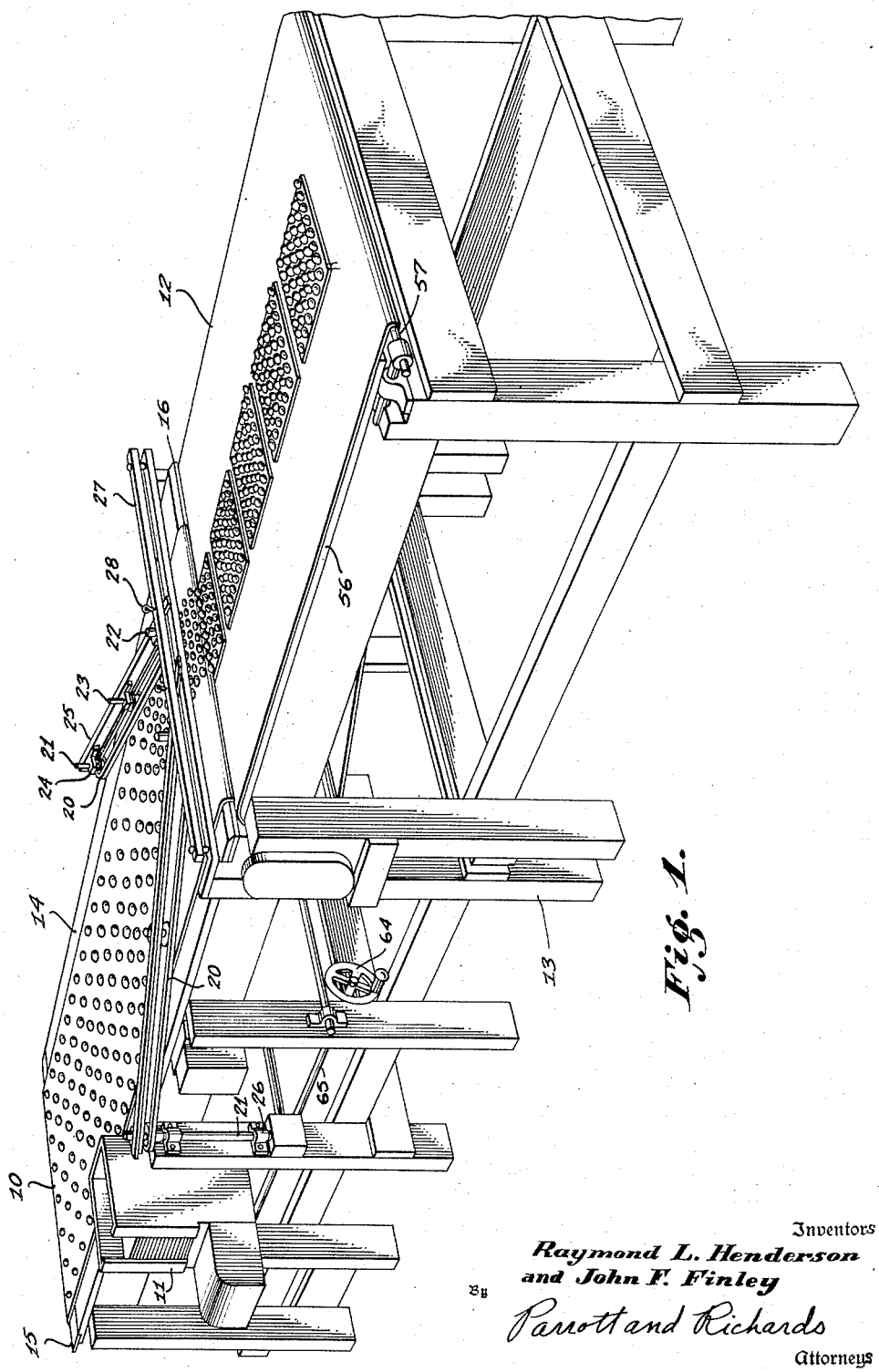

Inventors
Raymond L. Henderson
John F. Finley
By
Parrott and Richards
Attorneys

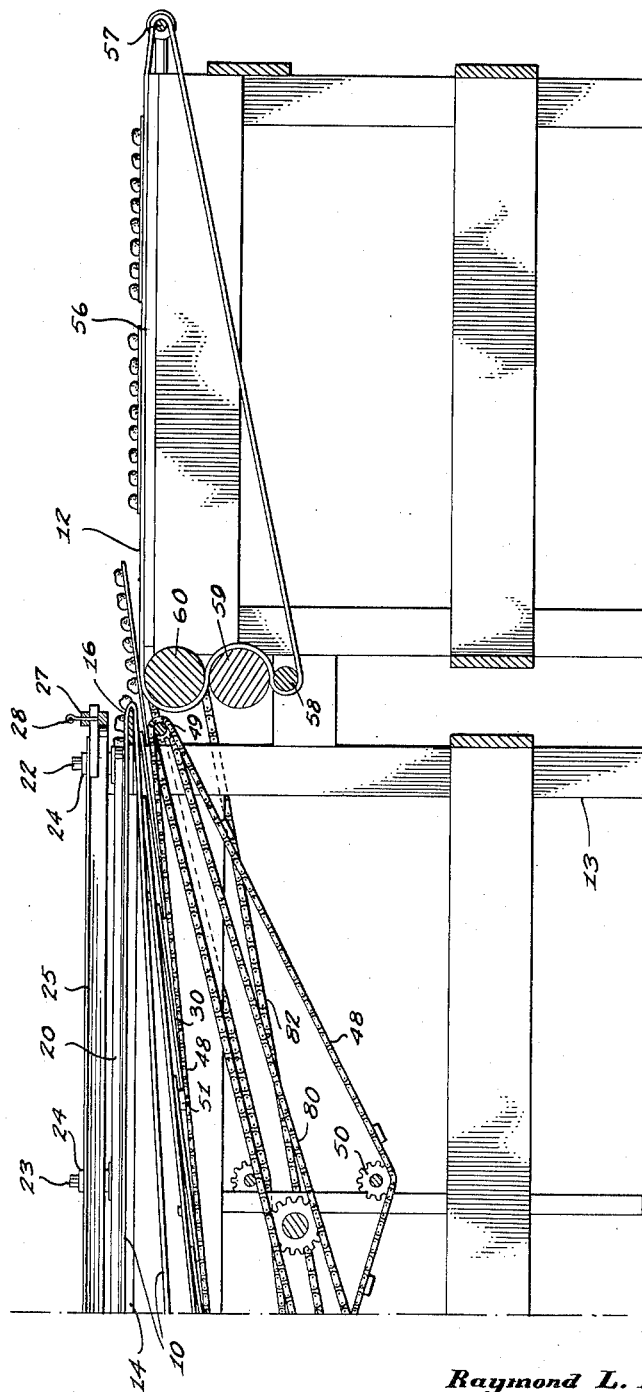

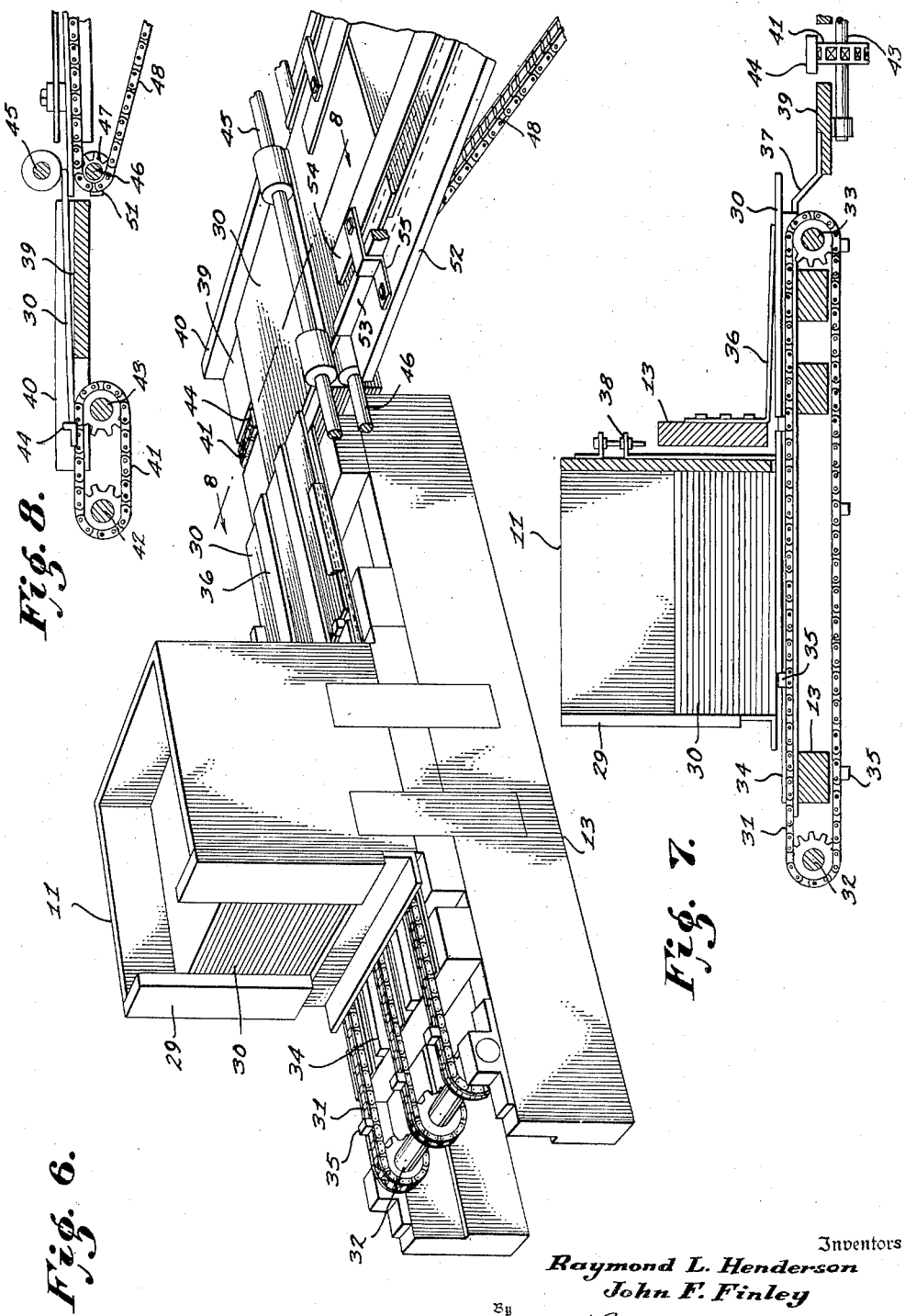

Patented Feb. 20, 1951

2,542,330

UNITED STATES PATENT OFFICE 2,542,330

CONVEYER SYSTEM

Raymond L. Henderson, Atlanta, and John F. Finley, Forest Park, Ga., assignors to Norris, Incorporated, a corporation of Georgia Application May 7, 1947, Serial No. 746,424

6 Claims. (Cl. 107—7)

This invention relates to conveyor systems, and more especially to such a system adapted for handling articles, such as candies or other confectionery material, during manufacturing operations.

In candy manufacturing processes which employ automatic coating machines or enrobers, the candies are commonly passed from the coating machines through a cooling tunnel, and then onto an endless belt from which they are transferred individually by hand to containers for shipping or for storage. According to usual practice the candies are placed in the shipping or storage containers in layers, a cardboard divider or similar plate element being inserted as each layer is completed to separate and support a succeeding layer. As will be apparent, the hand labor involved in this packing operation is considerable, and, moreover, the candies are easily damaged by handling in this manner.

The conveyor system of the present invention provides for automatically placing the candies, or other similar articles being processed, on plate elements such as cardboard dividers so that they may be presented at a packing station for transfer to storage boxes or the like in layers rather than individually by hand. This conveyor system makes it possible to carry out the packing operation with very substantially greater speed and with only a fraction of the hand labor formerly required. Also, all direct handling of the candies may be eliminated according to the present invention so that the damage incurred by previous methods through handling is avoided.

The invention is illustrated in the accompanying drawing, in which:

Fig. 1 is a perspective view of a conveyor system arranged according to the present invention;

Fig. 2 is a side elevation in which the supporting frame structure is shown in dotted lines and the conveyors are indicated diagrammatically;

Fig. 3 is a generally corresponding plan view with the conveyors removed;

Figs. 4 and 5 are complementary partial side elevations enlarged to show the disposition of the conveyors more in detail;

Fig. 6 is a perspective view illustrating the arrangement of the feeding mechanism for the plate elements;

Fig. 7 is a sectional detail of the containing means and transverse feeding run incorporated in the feeding mechanism; and Fig. 8 is a partial sectional detail of the longitudinal feeding run oriented substantially on the line 8—8 in Fig. 6.

Figure 4:
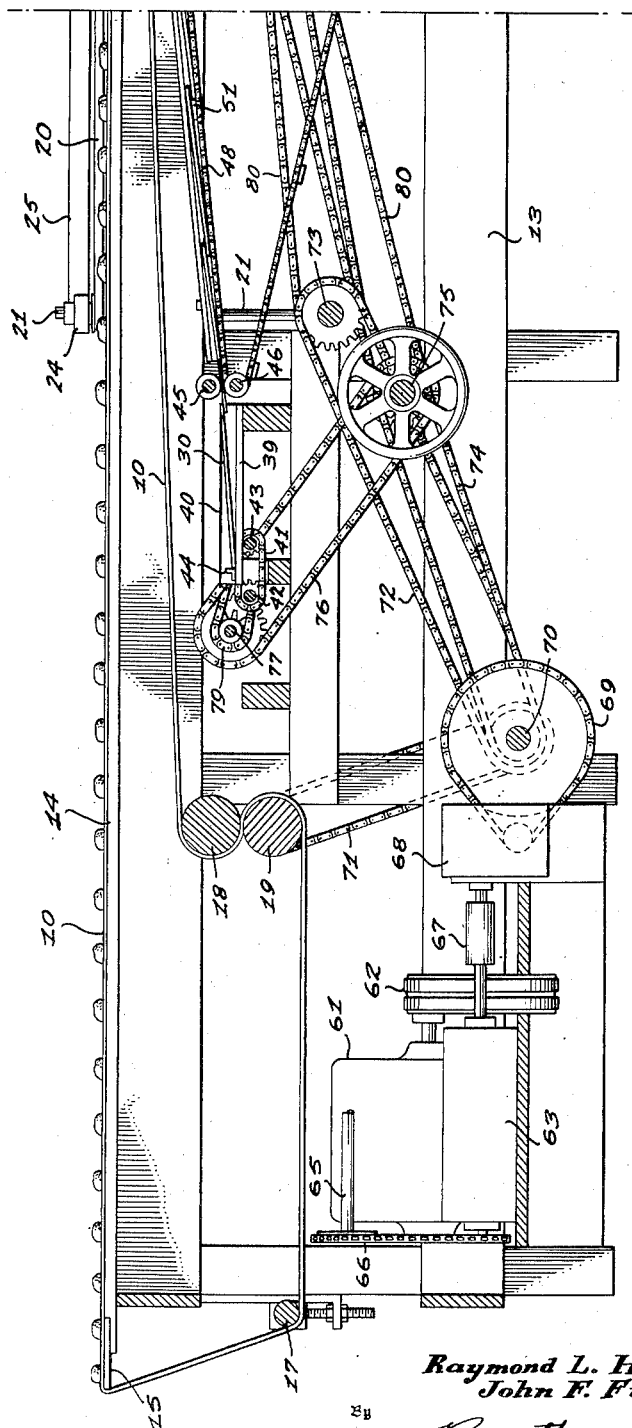

Referring first to Fig. 1 of the drawing, the conveyor system of the present invention comprises generally a first conveyor 10, an associated feeding mechanism 11, and a second conveyor 12, all of these elements being disposed on a suitable frame structure 13.

The first conveyor 10 consists of an endless run of impregnated cloth or the like adapted for receiving and carrying processed articles such as the candies mentioned above. The disposition of this first conveyor 10 on the frame structure 13 is illustrated more in detail in Figs. 2, 4 and 5. As shown, the first conveyor 10 is disposed with a level carrying reach over a suitable table portion 14 supported on frame structure 13. This table portion 14 is fitted with edge inserts 15 and 16 at each end so that the conveyor 10 may be angled over these ends and tensioned properly. Tensioning of the conveyor 10 is accomplished through an adjustable idler roll 17 which is mounted on frame structure 13 (see Figs. 2, 3 and 4), and from which the conveyor 10 is trained over the edge insert 15 at the forward end of table portion 14. The conveyor 10 is driven, as described more in detail below, by a geared pair of rolls 18 and 19 through which it is wrapped as illustrated best in Fig. 4.

The processed candies or similar articles are received on the level carrying reach of the first conveyor 10 at its forward end, and are carried by conveyor 10 toward its discharge end as illustrated in Figs. 1 and 4. Adjacent the discharge end of conveyor 10, gathering belts 20 are arranged to confine the candies to an area corresponding in width to the cardboard dividers or plate elements which are to be used for packing the candies. These gathering belts 20 are extended between suitable pulleys carried on shafts 21 and 22, and are supported by intermediate pulleys which are carried on shafts 23. The pulley shafts 21, 22 and 23 are mounted in bearing brackets 24 fixed on supporting arms 25, and the pulley shafts 21 extend downwardly in bearing supports 26 on frame structure 13 to a driving connection (as explained further below), so that they form a pivot point for the supporting arms 25. The other ends of the supporting arms 25 extend between spaced cross bars 27 which are carried by the frame structure 13, as shown, and which are formed with a series of holes to receive stop pins 28 in adjusted positions for locating the supporting arms 25 and consequently the gathering belts 20 with a proper pivoted disposition. In this manner the gathering belts 20 may be spaced as desired in accordance with the particular size of cardboard divider or plate element being used.

The feeding mechanism 11 is associated with the first conveyor 10 to dispose the cardboard dividers or plate elements to receive the candies at the discharge end of conveyor 10. The details of this feeding mechanism 11 are shown best in Figs. 6, 7 and 8 of the drawing. As shown, this mechanism comprises a hopper 29 or similar means for containing a supply of the cardboard dividers or plate elements which are indicated at 30. The hopper 29 is mounted at one side of the frame structure 13 (compare Fig. 1) so that it is easily accessible for filling, and transverse and longitudinal feeding runs are arranged for transferring the plate elements 30 from the hopper 29 to the discharge end of conveyor 10.

The transverse feeding run extends beneath hopper 29 and consists of feeder chains 31 operating on sprocket wheels carried by shafts 32 and 33 which are mounted on frame structure 13. The plate elements 30 are supported at the bottom of hopper 29 on slats 34 which are spaced between the feeder chains 31, and feeder chains 31 are fitted with lugs 35 which extend slightly above these slats 34 so that the bottom plate element 30 may be stripped from the hopper 29 and fed transversely by the feeder chains 31 on slats 34 as illustrated in Fig. 7. Spring arms 36 extend from the frame structure 13 to hold the plate elements 30 in place on the slats 34 for the full feeding reach of feeder chains 31, and guide strips 37 are arranged at the end of slats 34 to direct the plate elements 30 onto the longitudinal feeding run as described further below. So that plate elements 30 of different thickness may be used as desired, the hopper 29 is fitted with a gate member 38 which may be adjusted for the thickness being used.

The longitudinal feeding run receives the plate members 30 fed in this manner on a platform portion 39 fitted with a stop 40 at its far side for aligning the plate elements 30 longitudinally. The platform 39 is disposed at a level below that of the feeding reach of feeder chains 31 as shown in Figs. 6 and 7 of the drawing, and is slotted to provide clearance for a feeder chain 41 mounted on sprocket wheels which are carried on shafts 42 and 43, as shown in Fig. 8. The feeder chain 41 is fitted with a lug 44 adapted to engage the trailing edge of the plate elements 30 and move them into the nip of feeding rolls 45 and 46 which carry collars of rubber or some similar resilient material suitable for gripping the plate elements 30. The sprocket chains 31 of the transverse feeding run, and the feeder chain 41 of the longitudinal feeding run, are operated in timed relation so that the plate members 30 are transferred serially from the hopper 29 onto the platform 39 at a rate faster than they are moved away by the longitudinal feeding run (compare Fig. 6), so that the plate elements 30 are disposed on the longitudinal feeding run with the leading edge of each plate element 30 overlapping the trailing edge of the preceding plate element, and are picked up by the feeding rolls 45 and 46 in this overlapping relation (see Fig. 8).

The bottom feeding roll 46 is also fitted with sprocket wheels 47 carrying further feeding chains 48 which are extended to the discharge end of conveyor 10 over sprocket wheels mounted on a shaft 49 and are tensioned on their return reach over sprocket wheels 50. These feeder chains 48 carry lugs 51 which engage the plate elements 30 at the feeding rolls 45 and 46 and carry them along the remainder of the longitudinal feeding run. Beyond the feeding rolls 45 and 46, the feeder chains 48 are supported on inclines 52 which are arranged with side aligning strips 53, and retaining strips 54 mounted on brackets 55 to hold the plate members 30 in place on the feeder chains 48 and in engagement with the lugs 51.

The plate members 30 are presented serially at the discharge end of the first conveyor 10 to receive the processed candies as illustrated in Figs. 1 and 5. As the candies are transferred from the conveyor 10, the plate elements 30 are fed at a corresponding rate to receive them. As the plate elements 30 are filled in this manner they are transferred to the second conveyor 12 which is actuated at a rate of travel in excess of the rate of travel of the first conveyor 10 so that the filled plate elements are displaced from the discharge end of conveyor 10 to allow disposition of a succeeding plate element. As the plate elements 30 are fed in overlapped relation, this displacement of the plate elements 30 by the second conveyor 12 will uncover a succeeding plate element in position to receive candies from the first conveyor 10 and thus allow continuous operation. And the displacement of the filled plate elements 30 by the second conveyor 12 spaces them apart, as illustrated in Figs. 1 and 5, so that they may easily be removed individually for packing.

It should also be noted at this point that the faster rate of travel of the second conveyor 12 which results in spacing the filled plate elements 30 apart, likewise results in displacing the plate elements 30 being fed in overlapping relation so that they are disposed in substantially end-to-end contact at the discharge end of the first conveyor 10 for continuous filling. This effect may be observed by comparing Figs. 5 and 6 of the drawing in which the plate elements are shown being fed in overlapped relation on the feeder chains 48. The overlapped plate elements 30 are held in place on the feeder chains 48 by the retaining strips 54 up to a short distance before the discharge end of the first conveyor 10 is reached. Beyond this point, the plate elements 30 are fed under the return reach of the first conveyor 10 which imposes a friction drag on them as they pass the discharge end of the conveyor 10. Accordingly, the plate elements 30 being filled are not released until the end of the feeder chains 48 is reached, and these feeder chains 48 are disposed so that the plate elements 30 being filled are released only in time to allow the faster rate of travel of the second conveyor 12 to displace them from an overlapping relation to a disposition of substantially end-to-end contact with respect to the next succeeding plate element 30, as mentioned above.

As shown in Fig. 5, the second conveyor 12 which may also be formed of impregnated cloth or the like, is disposed on frame structure 13 with a carrying reach extending over a further table portion 56. Beyond this table portion 56, the conveyor 12 is tensioned over an adjustable idler roll 57, and is taken back over a second idler roll 58 for wrapping between geared driving rolls 59 and 60.

All of the elements of the conveyor system of the present invention are driven from a motor 61 (see Figs. 2, 3 and 4). The pulley shaft of motor 61 is connected through a belt drive 62 to the input shaft of a variable speed drive 63, which may be adjusted for a desired operating speed of the conveyor system from a handwheel 64 carried on a shaft 65 to operate a sprocket chain 66 arranged to actuate the control mechanism of the variable speed drive 63. The output shaft of the variable speed drive is coupled as at 67 to a gear box 68 from which a sprocket chain drive 69 is taken off to an operating shaft 70.

From this operating shaft 70, one sprocket chain 71 is taken off to the geared driving rolls 18 and 19 to drive the first conveyor 10, a second sprocket chain 72 is taken off to a shaft 73 for driving the gathering belts 20 and the second conveyor 12, and a third sprocket chain 74 is taken off to a shaft 75 for driving the feeding mechanism 11.

The transverse feeding run of the feeding mechanism 11 is driven from the shaft 75 by a sprocket chain 76 which runs to a shaft 77 connected through bevel gears as at 78 to shaft 33 carrying the feeder chains 31. The shaft 77 is also coupled through a sprocket chain 79 to shaft 42 for driving the feeder chain 41 at the platform portion 39 of the longitudinal feeding run. The feeder chains 48 of the longitudinal feeding run are driven from shaft 75 by a sprocket chain 80 which runs to shaft 49 adjacent the discharge end of conveyor 10.

The gathering belts 20 are driven from the shaft 73 through bevel gears as indicated at 81 which form the previously mentioned driving connection for the pulley shafts 21. The second conveyor 12 is driven by a sprocket chain 82 which extends from the shaft 73 to the geared driving rolls 59 and 60.

The above described driving arrangement makes it possible to time the various elements of the conveyor system easily for operation in accordance with the present invention, and allows for convenient adjustment of the operating speed to particular circumstances. The conveyor system of the present invention may also be easily adapted for use as a conventional packing table when it is desired to pack small boxes or cartons directly by hand. For this purpose the drive to the feeding mechanism 11 is disconnected either by removing the sprocket chain 74 or by releasing a clutch (not shown) interposed at the shaft 75. The gathering belts 20 may then be pivoted as described above to clear the full width of the first conveyor 10 so that it will transfer the processed candies at its discharge end directly onto the second conveyor 12 to present them at the packing station. Shelves (not shown) of suitable width may be hinged to the sides of the frame structure 13 adjacent the second conveyor 12 to provide a convenient supporting surface for the boxes or cartons being packed when the conveyor system is used in this manner.

We claim:

1. A conveyor system of the type described, comprising a first conveyor adapted for receiving and carrying processed articles, a feeding mechanism disposed beneath said first conveyor for advancing plate elements serially to receive said articles at the discharge end of said first conveyor, means for feeding said plate elements to said feeding mechanism in overlapped relation whereby they are advanced with the leading edge portion of each plate element overlapping a trailing edge portion of a preceding plate element, a second conveyor arranged for receiving said plate elements upon filling with articles from said first conveyor, means for driving said first conveyor and for operating said feeding mechanism in timed relation to advance said overlapped plate elements at a speed substantially equal to the speed of said first conveyor, and means for driving said second conveyor at a speed in excess of the speed of said first conveyor whereby said plate elements upon filling with articles are displaced from an overlapping relation to a disposition of substantially end-to-end contact with respect to the next succeeding plate element at the discharge end of said first conveyor for continuous filling from said first conveyor.

2. A conveyor system of the type described, comprising the combination with a first conveyor adapted for receiving and carrying processed articles, of an associated feeding mechanism disposed beneath said first conveyor for advancing plate elements serially to receive said articles at the discharge end of said conveyor, means for feeding said plate elements to said feeding mechanism in overlapped relation whereby they are advanced with the leading edge portion of each of the plate elements overlapping the trailing edge portion of the preceding plate element, a second conveyor arranged for receiving said plate elements upon filling with articles from said first conveyor, means for driving said first conveyor and for operating said feeding mechanism in timed relation to advance said overlapped plate elements at a speed substantially equal to the speed of said first conveyor, and means for driving said second conveyor at a speed in excess of the speed of said first conveyor whereby said plate elements upon filling are displaced from an overlapping relation to a disposition of substantially end-to-end contact with respect to the next succeeding plate element at the discharge end of said first conveyor for continuous filling from said first conveyor.

3. A conveyor system of the type described for transferring processed articles to a packing station, comprising a first conveyor adapted for receiving and carrying said processed articles, an associated feeding mechanism disposed beneath said first conveyor for advancing plate elements serially to receive said articles at the discharge end of said first conveyor, means for feeding said plate elements to said feeding mechanism in overlapped relation whereby they are advanced with the leading edge of each plate element overlapping the trailing edge of a preceding plate element, a second conveyor arranged for receiving said plate elements upon filling with articles from said first conveyor and presenting the filled plate elements at said packing station, means for driving said first conveyor and for operating said feeding mechinsm in timed relation to advance said overlapped plate elements at a speed substantially equal to the speed of said first conveyor, and means for driving said second conveyor at a speed in excess of the speed of said first conveyor whereby said plate elements upon filling are displaced from an overlapping relation to a disposition of substantially end-to-end contact at the discharge end of said first conveyor for continuous filling from said first conveyor and are spaced on said second conveyor for removal individually at said packing station.

4. A conveyor system of the type described, comprising a conveyor adapted for receiving and carrying processed articles and an associated feeding mechanism for advancing plate elements serially to receive said articles at the discharge end of said conveyor, said feeding mechanism comprising means for containing a supply of said plate elements and first and second feeding runs arranged transversely and longitudinally, respectively, in relation to said conveyor, said transverse feeding run being disposed with a feeding reach at a level above the starting level of the feeding reach of said longitudinal feeding run for transferring said plate elements serially from said containing means onto said longitudinal feeding run, and the feeding reach of said longitudinal feeding run being disposed beneath said conveyor and inclined upwardly from its starting level to present said plate elements serially at the discharge end of said conveyor, means for driving said conveyor and said longitudinal feeding run at substantially equal speeds, and means for driving said transverse feeding run at a speed fast enough to transfer said plate elements serially at a rate faster than they are moved away by said longitudinal feeding run whereby said plate elements are disposed on said longitudinal feeding run with a leading edge portion of each plate element overlapping a trailing edge portion of the preceding plate element and whereby said plate elements are presented in overlapping relation to receive said articles continuously at the discharge end of said conveyor.

5. A conveyor system of the type described for transferring processed articles to a packing station, comprising a first conveyor adapted for receiving and carrying said processed articles and an associated feeding mechanism for advancing plate elements serially to receive said articles at the discharge end of said first conveyor, said feeding mechanism comprising means for containing a supply of said plate elements and first and second feeding runs arranged transversely and longitudinally, respectively, in relation to said first conveyor, said transverse feeding run being disposed with a feeding reach at a level above the starting level of the feeding reach of said longitudinal feeding run for transferring said plate elements serially from said containing means onto said longitudinal feeding run, and the feeding reach of said longitudinal feeding run being disposed beneath said first conveyor and inclined upwardly from its starting level to present said plate elements serially at the discharge end of said first conveyor, a second conveyor arranged for receiving said plate elements upon filling with articles from said first conveyor and presenting the filled plate elements at said packing station, means for driving said first conveyor and said longitudinal feeding run at substantially equal speeds, means for driving said transverse feeding run at a speed fast enough to transfer said plate elements serially at a rate faster than they are moved away by said longitudinal feeding run whereby said plate elements are disposed on said longitudinal feeding run with a leading edge portion of each plate element overlapping a trailing edge portion of the preceding plate element whereby said plate elements are presented in overlapping relation to receive said articles continuously at the discharge end of said first conveyor, and means for driving said second conveyor at a speed in excess of the speed of said first conveyor whereby said plate elements upon filling are displaced from an overlapping relation to a disposition of substantially end-to-end contact at the discharge end of said first conveyor for continuous filling from said first conveyor and are spaced on said second conveyor for removal individually at said packing station.

6. A conveyor system of the type described, comprising the combination with a first conveyor adapted for receiving and carrying processed articles, of an associated feeding mechanism disposed beneath said first conveyor for advancing plate elements serially to receive said articles at the discharge end of said conveyor, means for feeding said plate elements to said feeding mechanism in overlapped relation whereby they are advanced with the leading edge portion of each of the plate elements overlapping the trailing edge portion of the preceding plate element, a supporting arm mounted adjacent each side of said first conveyor and extending toward and adjacent the discharge end of said first conveyor just above the carrying surface thereof, a plurality of pulley members disposed with vertical axes and in spaced and aligned relation on each of said supporting arms, an endless gathering belt extended over the pulley members on each of said supporting arms, each of said supporting arms being mounted for pivoting movement about the axis of the pulley member disposed thereon which is spaced farthest from the discharge end of said first conveyor, whereby said supporting arms may be pivoted for converging disposition of each of said gathering belts to confine articles supported on the carrying surface of said first conveyor to an area at the discharge end thereof corresponding in width to the width of said plate elements, a second conveyor arranged for receiving said plate elements upon filling with articles from said first conveyor, means for driving said first conveyor and for operating said feeding mechanism in timed relation to advance said overlapped plate elements at a speed substantially equal to the speed of said first conveyor, means for driving said farthest spaced pulley members so that the inwardly facing flights of said gathering belts move toward the discharge end of said first conveyor, and means for driving said second conveyor at a speed in excess of the speed of said first conveyor whereby said plate elements upon filling are displaced from an overlapping relation to a disposition of substantially end-to-end contact with respect to tthe next succeeding plate element at the discharge end of said first conveyor for continuous filling from said first conveyor.

RAYMOND L. HENDERSON.
JOHN F. FINLEY.

REFERENCES CITED

The following references are of record in the file of this patent:

UNITED STATES PATENTS

| Number | Name | Date |
|---|---|---|
| 1,160,792 | Van Houten | Nov. 16, 1915 |
| 1,939,810 | Green | Dec. 19, 1933 |
| 2,442,250 | Spain | May 25, 1948 |

FOREIGN PATENTS

| Number | Country | Date |
|---|---|---|
| 345,781 | France | Dec. 15, 1904 |